(12) United States Patent
Li

(10) Patent No.: US 11,797,184 B2
(45) Date of Patent: Oct. 24, 2023

(54) SD CARD HOT PLUGGING IDENTIFICATION METHOD, SD CARD IDENTIFICATION MODULE AND ELECTRONIC DEVICE

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 192 days.

(21) Appl. No.: 17/244,112

(22) Filed: Apr. 29, 2021

(65) Prior Publication Data

US 2021/0247901 A1 Aug. 12, 2021

Related U.S. Application Data

(63) Continuation of application No. PCT/CN2019/111707, filed on Oct. 17, 2019.

(51) Int. Cl.
*G06F 3/06* (2006.01)
*G06F 13/24* (2006.01)

(52) U.S. Cl.
CPC ............ *G06F 3/061* (2013.01); *G06F 3/0644* (2013.01); *G06F 3/0679* (2013.01); *G06F 13/24* (2013.01)

(58) Field of Classification Search
CPC ...... G06F 13/24; G06F 3/0679; G06F 3/0644; G06F 3/061
See application file for complete search history.

(56) References Cited

U.S. PATENT DOCUMENTS

2009/0073492 A1* 3/2009 Okabe ................ H04N 1/00965
358/1.16
2013/0185471 A1 7/2013 Yu

FOREIGN PATENT DOCUMENTS

CN 102479169 A 5/2012
CN 104272326 A 1/2015
(Continued)

OTHER PUBLICATIONS

The International Search Report dated Jan. 15, 2020 PCT/CN2019/111707 with English Translation.
(Continued)

*Primary Examiner* — Edward J Dudek, Jr.

(57) ABSTRACT

Embodiments of the present invention relates to an SD card hot plugging identification method, an SD card identification module and an electronic device. The SD card identification module includes: an interrupt generation unit configured to trigger an interrupt message according to an SD card inserting or ejecting behavior; a message parsing unit configured to determine an SD card status according to the interrupt message during operation of a device; and a device operating unit configured to perform a corresponding SD card operation according to the SD card status determined by the message parsing unit and a device node search unit. According to the present invention, an SD card inserting or ejecting behavior is detected according to a triggered interrupt, which can reduce resource consumption, enable a quick response to a hot inserting or ejecting behavior, accurately identify a current SD card status and avoid problems such as a device's failure to identify an SD card, a system crash or damage of the SD card.

11 Claims, 4 Drawing Sheets

(56) References Cited

FOREIGN PATENT DOCUMENTS

| | | |
|---|---|---|
| CN | 104866385 A | 8/2015 |
| CN | 105354116 A | 2/2016 |
| CN | 106301428 A | 1/2017 |
| CN | 109471829 A | 3/2019 |
| WO | WO-2016192185 A1 * | 12/2016 |

OTHER PUBLICATIONS

The First Chinese Office Action dated Feb. 3, 2020; Appln. No. 201811286397.X.

* cited by examiner

SD CARD HOT PLUGGING IDENTIFICATION METHOD, SD CARD IDENTIFICATION MODULE AND ELECTRONIC DEVICE

CROSS-REFERENCE

This application is a continuation application of international application No. PCT/CN2019/111707, filed on Oct. 17, 2019, which claims priority of Chinese Patent Application No. 201811286397.X, filed on Oct. 31, 2018, which is incorporated herein by reference in its entirely.

BACKGROUND

Technical Field

The present invention relates to the technical field of SD cards, and in particular, to an SD card hot plugging identification method, an SD card identification module and an electronic device.

Related Art

An SD card is a data storage device based on a semiconductor flash memory. Due to a small volume and a large data transmission speed, SD cards are widely used in some electronic devices with a small volume (such as various types of portable smart terminals, image capture devices or communication devices) as a mass storage device.

During use, the SD card is usually placed in an SD card slot specially disposed in the electronic device and is electrically connected to the electronic device through a corresponding pin. The SD card also supports hot plugging. In other words, a user may conveniently insert the SD card into the slot or eject the SD card from the slot according to actual requirements during operation of the device without affecting usage of the SD card.

An existing SD card hot plugging method is usually implemented by periodically detecting a status of an SD card node in a device node. Limited by resource consumption, a detection period cannot be indefinitely shortened.

Therefore, when the SD card is frequently subjected to hot plugging for many times, the SD card cannot be identified or a device crashes frequently, or even the SD card is damaged. As a result, the SD card cannot be normally read and written or storage content is damaged.

SUMMARY

In order to resolve the above technical problems, embodiments of the present invention provide an SD card hot plugging identification method, an SD card identification module and an electronic device that can ensure stable operation of the electronic device and avoid an identification error when an SD card is quickly inserted and ejected.

In order to resolve the above technical problems, the embodiments of the present invention provide the following technical solutions: An SD card hot plugging identification method includes
determining an SD card status according to an interrupt message during operation of a device, the interrupt message being triggered by an SD card inserting or ejecting behavior; and performing a corresponding SD card operation according to the SD card status.
Optionally, the performing a corresponding SD card operation according to the SD card status includes: performing a loading operation when the SD card status is inserted; and performing an unloading operation when the SD card status is ejected.

Optionally, the method further includes: determining the SD card status by searching for a device node during booting of the device.

Optionally, the determining the SD card status by searching for a device node includes: determining whether the device node is allowed to be started; if not, determining that the SD card status is ejected; if so, searching the device node for an SD card node and a corresponding SD card partition; determining that the SD card status is inserted when the SD card node and the SD card partition are searched out; and determining that the SD card status is ejected when the SD card node and the SD card partition are not present.

Optionally, the determining an SD card status according to an interrupt message includes: triggering a corresponding kernel interrupt in response to the SD card inserting or ejecting behavior; transmitting a corresponding interrupt message to an application layer according to the kernel interrupt; and determining that the SD card status is inserted when message content obtained by the application layer by parsing the interrupt message includes an SD card inserted field; and determining that the SD card status is ejected when the message content obtained by the application layer by parsing the interrupt message includes an SD card ejected field.

Optionally, the unloading operation includes: stopping read and write operations on an SD card; determining whether the SD card is successfully unloaded; and if not, re-unloading the SD card after waiting for a preset time period.

Optionally, the method further includes: unloading an SD card before performing the loading operation and determining whether a test file is writeable into the loaded SD card and deletable from the SD card after performing the loading operation; if so, determining that the SD card is successfully loaded; and if not, determining that the SD card is unsuccessfully loaded.

In order to resolve the above technical problem, the embodiments of the present invention further provide the following technical solutions: An SD card identification module includes:
an interrupt generation unit configured to trigger an interrupt message according to an SD card inserting or ejecting behavior; a message parsing unit configured to determine an SD card status according to the interrupt message during operation of a device; and a device operating unit configured to perform a corresponding SD card operation according to the SD card status determined by the message parsing unit.

Optionally, the device operating unit includes: an SD card loading assembly configured to perform a loading operation when the SD card status is inserted; and an SD card unloading assembly configured to perform an unloading operation when the SD card status is ejected.

Optionally, the SD card identification module further includes: a device node search unit configured to determine the SD card status by searching for a device node during booting of the device.

Optionally, the device node search unit is configured to: determine whether the device node is allowed to be started; if not, determine that the SD card status is ejected; if so, search the device node for an SD card node and a corresponding SD card partition; determine that the SD card status is inserted when the SD card node and the SD card partition are searched out; and determine that the SD card status is ejected when the SD card node and the SD card partition are not present.

Optionally, the interrupt generation unit is specifically configured to trigger a corresponding kernel interrupt in response to the SD card inserting or ejecting behavior; and transmit a corresponding interrupt message to an application layer according to the kernel interrupt; and the message parsing unit is in the application layer and is specifically configured to parse the interrupt message to obtain message content, determine that the SD card status is inserted when the message content includes an SD card inserted field, and determine that the SD card status is ejected when the message content includes an SD card ejected field.

Optionally, the SD card unloading assembly is specifically configured to: stop read and write operations on an SD card; determine whether the SD card is successfully unloaded; and if not, re-unload the SD card after waiting for a preset time period.

Optionally, the SD card loading assembly is further configured to: determine whether a test file is writeable into the loaded SD card and deletable from the SD card; if so, determine that the SD card is successfully loaded; and if not, determine that the SD card is unsuccessfully loaded.

In order to resolve the above technical problem, the embodiments of the present invention further provide the following technical solutions: An electronic device includes an SD card slot and a controller, where the SD card slot is configured to receive an SD card and establish an electrical connection to the SD card; the controller is connected to the SD card slot to perform data read and write operations on the SD card inserted into the SD card slot; and the controller further includes the above SD card identification module to identify, through the SD card identification module, an SD card inserting or ejecting behavior that occurs in the SD card slot.

Compared with the prior art, in the SD card identification method provided in the embodiments of the present invention, an SD card inserting or ejecting operation is detected according to a triggered interrupt, which can reduce resource consumption, enable a quick response to a hot plugging action, accurately identify a current SD card status and avoid a device's failure to identify an SD card, a system crash or damage of the SD card.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Figure 1:
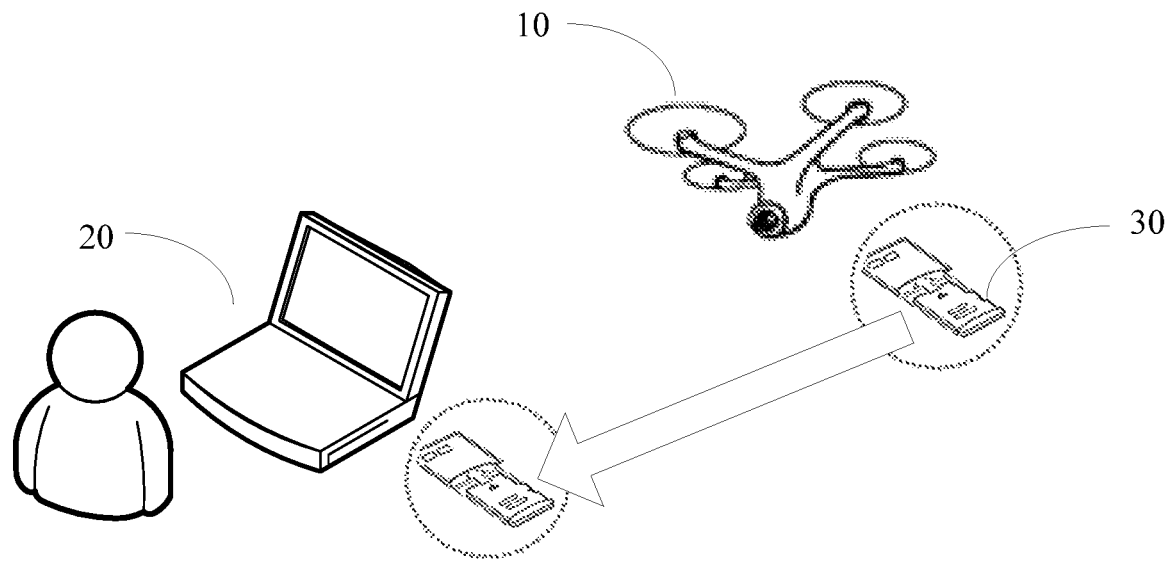
FIG. 1 is a schematic diagram of an application environment according to an embodiment of the present invention.

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or component must have a particular orientation or must be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in the present invention are the same as that usually understood by a person skilled in the technical field to which the present invention belongs. In the present invention, terms used in the specification of the present invention are merely intended to describe objectives of the specific embodiments, but are not intended to limit the present invention. A term "and/or" used in this specification includes any or all combinations of one or more related listed items.

In addition, technical features involved in different embodiments of the present invention described below may be combined together if there is no conflict.

Hot plugging, also known as hot swap, refers to an action of removing or replacing components such as storage devices and interactive devices connected to a host system without turning off the host system or cutting off a power supply.

During application of a UAV, data such as aerial images or operation logs of the UAV is usually stored in a mass storage device such as an SD card. In case of a large amount of aerial photography tasks, it is usually necessary to replace the SD card at intervals to facilitate management of relevant data.

Moreover, when a user obtains and retrieves relevant data information such as aerial images, flight logs and the like, a relatively high transmission speed is required due to a large amount of the data. Therefore, the user needs to take out an SD card from a device such as the UAV and connect the SD card to a device used by the user, to directly obtain the relevant data information from the SD card.

Based on requirements of one or more practical application scenarios, the SD card needs to be frequently ejected from or inserted into a relevant device such as the UAV, that is, a hot plugging operation of the SD card.

In a usual operating system, an SD card hot plugging operation is actively searched or identified and a status of an SD card device node is actively obtained in a set period. Such an active search or identification method consumes a lot of resources and is prone to a status identification error during frequent hot plugging, resulting in a failure to identify an SD card, a device crash and the like.

An application environment shown in FIG. 1 is given by way of example. As shown in FIG. 1, the application environment may include a UAV 10, user equipment 20 and an SD card 30.

The UAV 10 may be a UAV driven by any type of power (such as electricity), including but not limited to a four-axis UAV, a fixed-wing aircraft and a helicopter model. In this embodiment, a four-axis UAV is given by way of example for description.

The UAV 10 has a volume or power corresponding to actual requirements and can provide users with a load capacity, a flight speed, a flight range and the like that satisfy usage requirements. As a mobile vehicle, the UAV 10 may be equipped with one or more functional modules to perform corresponding tasks (such as aerial reconnaissance).

Figure 2:
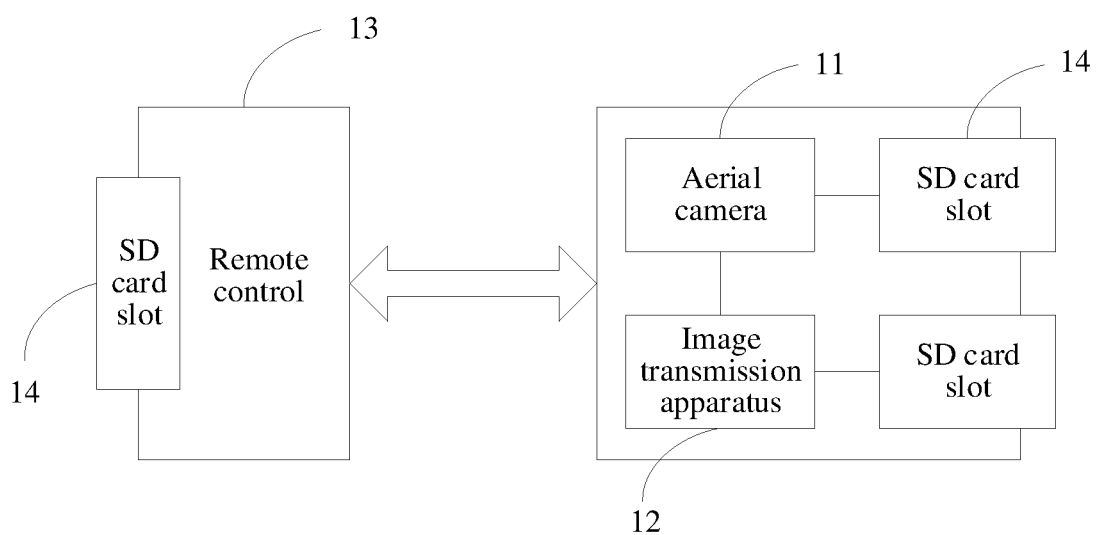
FIG. 2 is a functional block diagram of an unmanned aerial vehicle (UAV) according to an embodiment of the present invention.

FIG. 2 is a functional block diagram of the UAV 10 according to an embodiment of the present invention. As shown in FIG. 2, in this embodiment, the UAV 10 may carry an aerial camera 11 and a video transmission apparatus 12 and has a matched remote control 13.

The aerial camera 11 may be mounted on the UAV 10 through a mounting and fixing component such as a gimbal to capture image information of a target area during flight. The image transmission apparatus 12, which is an image data transmission system, is connected to the aerial camera. The image transmission apparatus may transmit, based on a communication connection manner such as radio frequency, data collected by the aerial camera to the outside.

The image transmission apparatus 12 is a data transmission apparatus that is mounted at one end of the UAV and is configured to transmit processed video data to an intelligent terminal or other ground devices. A corresponding antenna and a corresponding radio frequency unit may be disposed on the image transmission apparatus to load image data on a radio frequency signal for transmission.

The remote control 13 serves as an interactive device to implement interaction between the UAV and a user. The user may transmit a control instruction to the UAV through the remote control 13 or receive, in real time through the remote control 13, the image information fed back by the image transmission apparatus. One or more interactive devices such as a display screen, keys, a touch screen or a joystick may be disposed on the remote control according to actual requirements to perform corresponding interactive functions.

An SD card slot 14 may be disposed on each of the aerial camera 11, the image transmission apparatus 12 and the remote control 13 to accommodate an SD card. One or more metal pins are disposed in the SD card slot to establish an electrical connection to the SD card to provide a physical transmission channel required for data transmission.

In some embodiments, one or more structural settings may be further added to the SD card slot according to actual requirements. For example, a card locking structure is added to lock the SD card or a fool-proof structure is added to prevent the SD card from being inserted reversely.

The SD card 30 may selectively have any suitable shape, size, storage capacity and read/write speed according to actual requirements. The SD card 30 matches the SD card slot and serves as a mass storage device of electronic devices such as the aerial camera 11, the image transmission apparatus 12 and the remote control 13 when inserted into SD card slots of the electronic devices.

For example, the SD card may be configured to store image data captured by the aerial camera 11 and operation logs of the UAV during flight.

When requiring the data stored in the SD card 30, the user may directly remove the SD from the SD card slot and insert the SD card into the user equipment 20 used by the user and then directly manipulate, on the user equipment 20, the data on the SD card.

The user equipment 20 may be any type of electronic device having an SD card data read capability, such as a mobile phone, a tablet computer, a PDA or the like. The user equipment 20 may be equipped with one or more different input/output devices. The input/output devices include but are not limited to keys, a scroll wheel, a display screen, a touch screen, a mouse, a speaker and the like.

The electronic device disposed on the UAV runs a host system (such as the Linux operating system) to coordinate and control work between various hardware devices. During operation of the host system, when the SD card is ejected or inserted by the user, the host system needs to get feedback in time, determine a current state of the SD card and perform corresponding configuration operations, so that the SD card can be loaded or unloaded smoothly, thereby ensuring normal operation and use of the system and the SD card.

Figure 3:
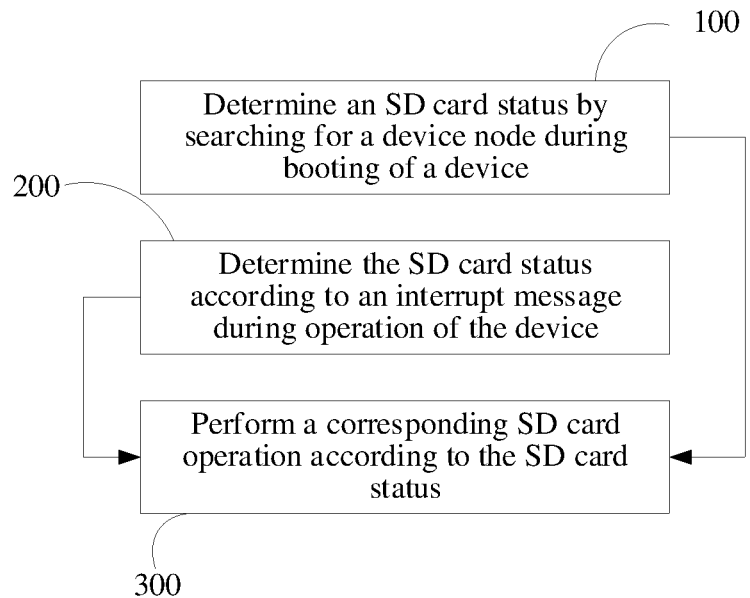
FIG. 3 is a method flowchart of an SD card hot plugging identification method according to an embodiment of the present invention.

FIG. 3 is a method flowchart of an identification method according to an embodiment of the present invention. As shown in FIG. 3, the identification method includes detecting an SD card status during booting and operation of a device.

100: Determine the SD card status by searching for a device node during booting of the device.

In this embodiment, the SD card status refers to a current working status of an SD card slot, which is used to indicate whether an SD card is inserted into the SD card slot and whether an electrical connection is established to a pin of the SD card slot.

Through the step, an initial SD card status of the SD card slot can be provided or determined, that is, indicates whether an SD card has been inserted into the SD card slot.

200: Determine the SD card status according to an interrupt message during operation of the device. The interrupt message is triggered by an SD card inserting or ejecting behavior.

Since the inserting or ejecting behavior occurs during normal operation of the electronic device, such an SD card inserting or ejecting behavior usually causes a change of corresponding electrical signal to change (for example, a change of a level signal of a detection pin in the SD card slot).

Based on such a change, a corresponding interrupt message is generated in an operating system. The interrupt message may specifically adopt any type of format or content structure and is transferred to an application layer for parsing to learn occurrence of inserting or ejecting and update the SD card status accordingly.

The above method adopts passive detection for the device to determine the SD card status, which makes responses and feedback only when an inserting or ejecting behavior occurs. Such a passive trigger manner does not require long-term existence of a detection thread, which consumes few resources. In addition, the passive trigger manner can respond to and feed back the SD card status more quickly, so that an identification error or untimely update are unlikely to occur.

300: Perform a corresponding SD card operation according to the SD card status.

The SD card operation refers to a process in which the host system performs configuration for an SD card that has been ejected or that is newly inserted. The SD card can serve as a mass storage device of the host system only after the configuration is completed, to implement data read and write functions.

Specifically, the SD card operation may include an unloading operation of removing an original SD card from the host system and a loading operation of adding a new SD card to the host system.

The loading operation is performed when the SD card status is inserted. The unloading operation is performed when the SD card status is ejected.

In the embodiments of the present invention, detection is performed on the SD card in two different manners during booting and operation of the device, which can desirably reflect the inserting or ejecting action of the SD card. In particular, the inserting or ejecting action of the SD card is detected by using the interrupt message during operation, which can accurately reflect whether the SD card is ejected or inserted. The status of the SD card can be accurately identified even in case of quick inserting or ejecting of the SD card.

Such an interrupt generation manner does not generate a specific thread that runs periodically but generates corresponding message content for feedback to the system only when an action is occurring, which can desirably reduce resource consumption.

Figure 4:
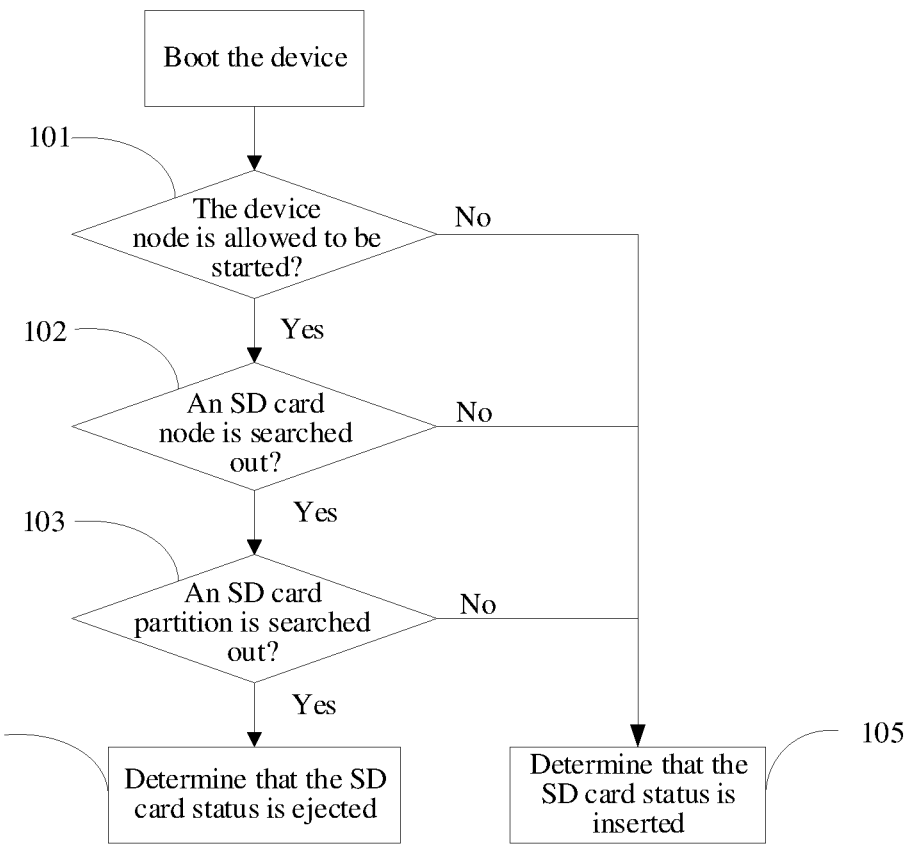
FIG. 4 is a method flowchart of an SD card device search method according to an embodiment of the present invention.

In some embodiments, as shown in FIG. 4, the method of determining the SD card status by searching for the device node may include the following steps.

101: Determine whether the device node is allowed to be started. If so, step 102 is performed, and if not, step 105 is performed. The device node refers to a presentation item of an external device connected to the device in the host system. Each hardware device connected to the electronic device that can run normally has a corresponding device node in the host system.

102: Determine whether an SD card node can be searched. If so, step 103 is performed, and if not, step 105 is performed.

The SD card node is one of items in the device node. It may be understood that when the SD card is inserted into the SD card slot and an electrical connection is established to the electronic device, the SD card node can be retrieved from a directory under the device node.

103: Determine whether an SD card partition can be obtained. If so, step 104 is performed. if not, step 105 is performed.

As a mass device, the SD card may be divided into a plurality of different partitions for use. Each of the partitions occupies a specific storage space or capacity to store different data.

104: Determine that the SD card status is inserted.

The SD card status being inserted indicates that the SD card is currently in the SD card slot, the SD card can be normally connected to and identified by a system of the device and the device can read and write data on the SD card.

105: Determine that the SD card status is ejected.

When the SD card status is ejected, it indicates that currently there is no SD card in the SD card slot, no connection is established between the device and the SD card and the SD card slot is empty.

Figure 5:
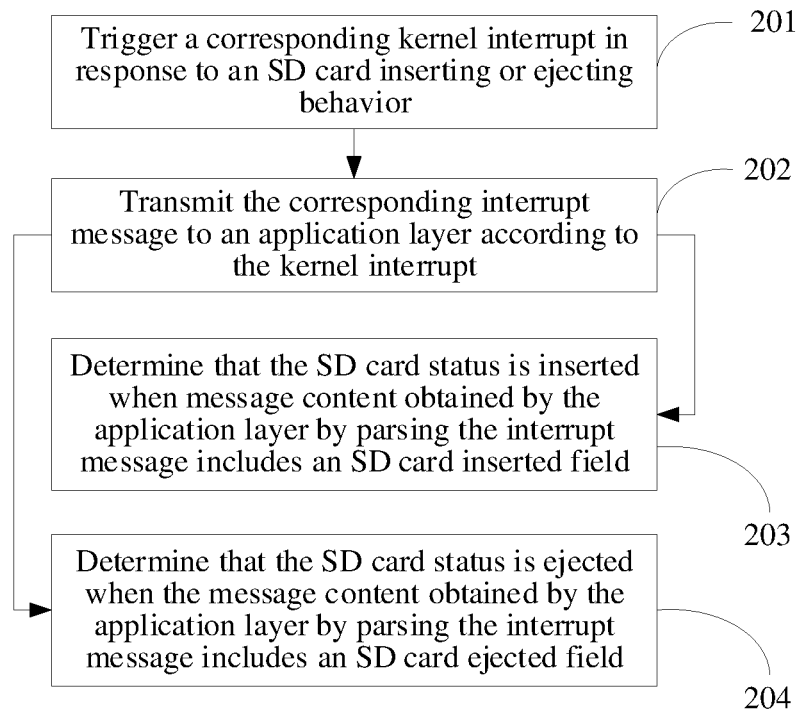
FIG. 5 is a method flowchart of step 200 shown in FIG. 3.

In some embodiments, as shown in FIG. 5, the method of determining the SD card status according to the interrupt message may specifically include the following steps:

201: Trigger a corresponding kernel interrupt in response to the SD card inserting or ejecting behavior.

The SD card inserting or ejecting behavior refers to an action of inserting an SD card into an SD card slot or ejecting the SD card from the SD card slot by a user. As the actions occur, hardware triggers generation of a kernel interrupt in response to such action signals.

202: Transmit a corresponding interrupt message to an application layer according to the kernel interrupt.

After the kernel interrupt is generated, a kernel may correspondingly edit an interrupt message having a corresponding content message to the application layer to report the SD card inserting or ejecting behavior to the device timely.

203: Determine that the SD card status is inserted when message content obtained by the application layer by parsing the interrupt message includes an SD card inserted field.

The SD card inserted field may specifically have any type or structure and is used to represent data information or content indicating an SD card insertion action. A specific form of the SD card inserted field depends on editing or a format of the interrupt message.

204: Determine that the SD card status is ejected when the message content obtained by the application layer by parsing the interrupt message includes an SD card ejected field.

Similarly, the SD card ejected field refers to message content obtained after parsing the interrupt message at the same field position or different field positions.

For example, the SD card Inserted field may be "Status": "Inserted", and the SD card ejected field may be "Status": "Ejected".

In some embodiments, if fields such as "SUBSYSTEM=block" and "DEVTYPE=partition" are present in the message content parsed out, it may indicate that the fields are information related to the SD card. When a relevant message starts with "add" or a similar field, it may also be considered as an SD card inserted field. When related messages start with "remove" or similar fields, they are considered as an SD card ejected field, indicating that an SD card is ejected. A name of an SD card partition may be obtained by the application layer by interpreting "DEV-NAME=".

Figure 6:
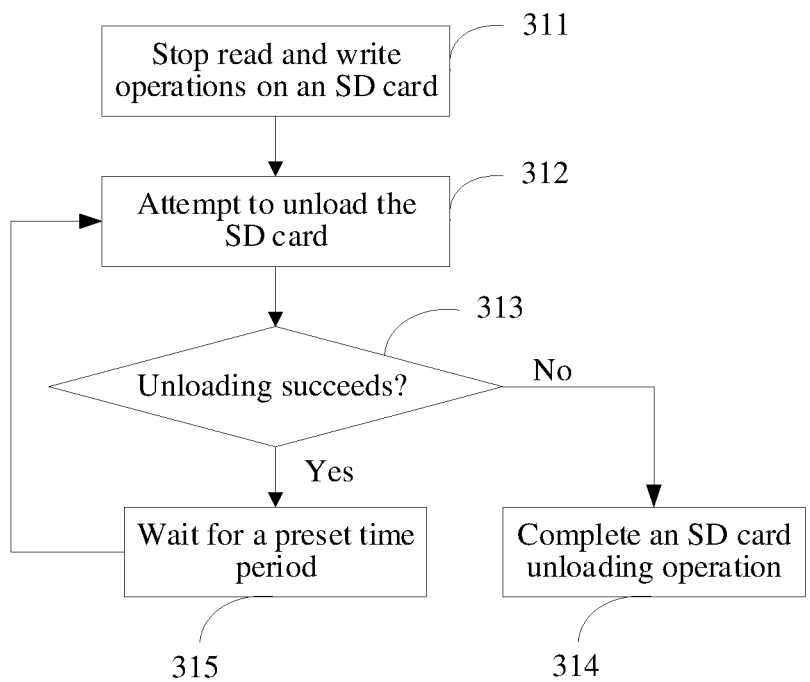
FIG. 6 is a method flowchart of an SD card unloading operation according to an embodiment of the present invention.

In order to successfully load or unload the SD card, additional steps may be further added in addition to the conventional unloading and loading steps. As shown in FIG. 6, the unloading operation provided in the embodiments of the present invention may include the following steps:

311: Stop read and write operations on an SD card.

The read and write operations on the SD card refer to operations of reading data from the SD card or writing data into the SD card, such as playback of photographs and videos from the aerial camera or files on the remote control. During the read and write operations, a changing electrical signal is generated on a physical transmission channel (such as a transmission pin of the SD card) and the SD card needs to remain connected to the host system.

312: Attempt to unload the SD card.
313: determine whether the unloading succeeds, if so, perform step 314, and if not, perform step 315.

Generally, an operation instruction for unloading the SD card does not always succeed and is prone to influence by many factors. For example, when the SD card is busy (occupied by a thread of the host system), the operation instruction cannot be successfully executed. Therefore, a plurality of attempts may be required.

314: Determine that the SD card is successfully unloaded and complete an SD card unloading operation.
315: Return to step 312 after waiting for a preset time period.

The preset time period is an empirical value, which may be specifically set by a technician according to actual situations or actual requirements, for example, may be set to 1 s. After a suitable waiting time period, unloading is attempted again to ensure that the SD card can be successfully unloaded.

Certainly, in order to avoid influence to operation of the system by repeated attempts of unloading the SD card, an upper attempt limit may be set. When a number of unloading attempts reach the upper limit, other appropriate remedial approaches are enabled.

Figure 7:
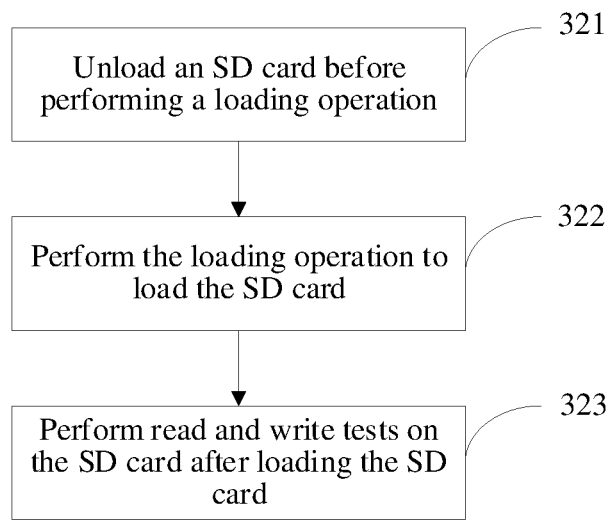
FIG. 7 is a method flowchart of an SD card loading operation according to an embodiment of the present invention.

As shown in FIG. 7, in the embodiments of the present invention, a complete loading operation may consist of the following three steps:

321: Unload an SD card before performing the loading operation.

Performing the unloading operation first can avoid influence of a previously loaded SD card that has not been unloaded, thereby avoiding a system error.

322: Perform the loading operation to load the SD card.
323: Perform read and write tests on the SD card after loading the SD card. The read and write test may be specifically implemented by writing and deleting a test file. For example, a small test file may be written into an SD card path after display of successful loading and then deleted. Then, it is determined whether the test file is writeable and deletable. If so, it is determined that the SD card is successfully loaded. If not, it is determined that the SD card is unsuccessfully loaded.

It should be noted that the identification method provided in the embodiments of the present invention is illustrated by using the Linux operating system as an example. However, based on the inventive ideas and principles disclosed in the embodiments of the present invention, those skilled in the art may also make general adjustments, combinations or changes to the identification method and apply the identification method to other different operating systems to identify the SD card status during hot plugging of the SD card.

Based on the identification method disclosed in the above method embodiments, an embodiment of the present invention further provides an SD card identification module. The SD card identification module may be separately or integrally disposed in a controller of a relevant electronic device to implement one or more steps in the above method embodiments to support and implement quick hot plugging of the SD card.

Figure 8:
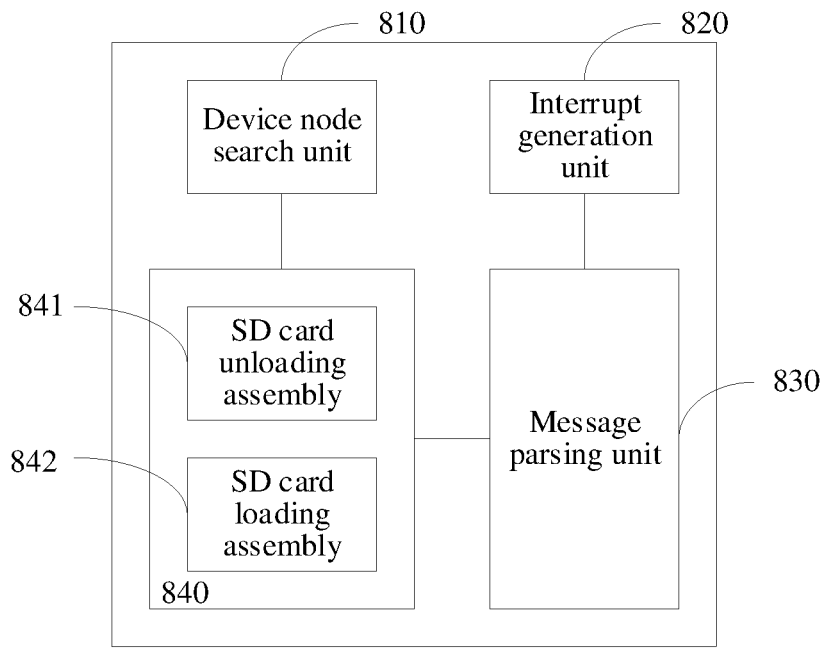
FIG. 8 is a structural block diagram of an SD card hot plugging identification module according to an embodiment of the present invention.

FIG. 8 shows an SD card identification module according to an embodiment of the present invention. As shown in FIG. 8, the SD card identification module may include a device node search unit 810, an interrupt generation unit 820, a message parsing unit 830 and a device operating unit 840.

The device node search unit 810 is configured to determine an SD card status by searching for a device node during booting of a device.

The interrupt generation unit 820 is configured to trigger an interrupt message according to an SD card inserting or ejecting behavior. The message parsing unit 830 is configured to determine the SD card status according to the interrupt message during operation of the device.

Based on an SD card status detection result provided by the device node search unit 810 or the message parsing unit 830, the device operating unit 840 may be configured to perform a corresponding SD card operation according to the SD card status determined by the message parsing unit and a device node search unit.

Specifically, as shown in FIG. 8, the device operating unit 840 may consist of an SD card loading assembly 841 and an SD card unloading assembly 842.

The SD card loading assembly 841 is configured to perform a loading operation when the SD card status is inserted. The SD card unloading assembly 842 is configured to perform an unloading operation when the SD card status is ejected. Based on the SD card loading assembly 841 and the SD card unloading assembly 842, the SD card may be automatically loaded or unloaded according to the SD card status, facilitating usage of users.

Preferably, the SD card unloading assembly may perform the unloading operation by using the following functional steps: first, stopping read and write operations on the SD card; then attempting to unload the SD card and determining whether the SD card is successfully unloaded; and if not, re-unloading the SD card after waiting for a preset time period until the SD card can be successfully unloaded. This manner can avoid a problem that the SD card cannot be unloaded in a busy status.

In addition to performing the loading operation, the SD card loading assembly 841 may be further configured to determine whether a test file is writeable into the loaded SD card and deletable from the SD card after loading the SD card; if so, determine that the SD card is successfully loaded; and if not, determine that the SD card is unsuccessfully loaded.

In addition, in order to avoid an SD card that has not been unloaded before loading of the SD card, the SD card unloading assembly may unload the SD card before the SD card loading assembly loads the SD card.

In some embodiments, the device node search unit may specifically perform the following functional steps: first, determining whether the device node is allowed to be started; if not, determining that the SD card status is ejected; if so, searching the device node for an SD card node and a corresponding SD card partition; determining that the SD card status is inserted when the SD card node and the SD card partition are searched out; and determining that the SD card status is ejected when the SD card node and the SD card partition are not present.

In other embodiments, during operation of the device, the interrupt generation unit 820 and the message parsing unit 830 perform the following steps in response to the SD card inserting or ejecting action:

First, the interrupt generation unit 820 is configured to trigger a corresponding kernel interrupt in response to the SD card inserting or ejecting behavior and transmit a corresponding interrupt message to the application layer of the system according to the kernel interrupt.

The message parsing unit 830 is an assembly in the application layer. The message parsing unit may parse the interrupt message to obtain corresponding message content and determine a specific status of the SD card accordingly, that is, determine that the SD card status is inserted when the message content includes an SD inserted field and determine that the SD card status is ejected when the message content includes an SD card ejected field.

Based on the above, the identification module provided in the embodiments of the present invention identifies the SD card status during operation and booting of the device in different detection manners, which can desirably reflect a current SD card status and prevent a misoperation on the SD card, thereby avoiding a device's failure to identify the SD card, a system crash or damage to the SD card as a result of a plurality of operations.

In addition, during the hot plugging of the SD card, the SD card may be automatically loaded and unloaded according to the status of the SD card, facilitating usage of users.

It should be noted that, although in the embodiments of the present invention, the SD card identification module (such as the device node search unit 810, the interrupt generation unit 820, the message parsing unit 830 and the device operating unit 840) are described through only functional naming and functional description, those skilled in the art may use a different method to implement described functions for each specific application according to actual requirements (such as power consumption, chip area costs, circuit implementation difficulty and the like), for example, selectively use hardware, software or a combination of software and hardware to implement one or more functions of the SD card identification module disclosed in the embodiments of the present invention. Such an implementation should not be considered beyond the scope of the present invention. Hardware circuit combinations or software program used to implement the functions are well known to those skilled in the art under the premise that to-be-performed the functions are already known.

It should be noted that the foregoing embodiments are merely intended for describing the technical solutions of the present invention rather than limiting the present invention. Under the ideas of the present invention, the technical features in the foregoing embodiments or different embodiments may also be combined, the steps may be performed in any order, many other changes of different aspects of the present invention also exist as described above, and these changes are not provided in detail for simplicity. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not make the essence of corresponding technical solutions depart from the scope of the technical solutions of the embodiments of the present invention.

What is claimed is:

1. An SD card hot plugging identification method, comprising:
    determining an SD card status according to an interrupt message during operation of a device, the interrupt message being triggered by an SD card inserting or ejecting behavior; and
    performing a corresponding SD card operation according to the SD card status;
    wherein the performing a corresponding SD card operation according to the SD card status comprises:
    performing a loading operation when the SD card status is inserted; and performing an unloading operation when the SD card status is ejected;
    the method further comprising:
    unloading an SD card before performing the loading operation;
    determining whether a test file is writeable into the loaded SD card and deletable from the SD card after performing the loading operation;
    if so, determining that the SD card is successfully loaded; and if not, determining that the SD card is unsuccessfully loaded.

2. The identification method according to claim 1, further comprising: determining the SD card status by searching for a device node during booting of the device.

3. The identification method according to claim 2, wherein the determining the SD card status by searching for a device node comprises:
    determining whether the device node is allowed to be started; if not, determining that the SD card status is ejected;
    if so, searching the device node for an SD card node and a corresponding SD card partition;
    determining that the SD card status is inserted when the SD card node and the SD card partition are searched out; and
    determining that the SD card status is ejected when the SD card node and the SD card partition are not present.

4. The identification method according to claim 1, wherein the determining an SD card status according to an interrupt message comprises: triggering a corresponding kernel interrupt in response to the SD card inserting or ejecting behavior; transmitting a corresponding interrupt message to an application layer according to the kernel interrupt; determining that the SD card status is inserted when message content obtained by the application layer by parsing the interrupt message comprises an SD card inserted field; and determining that the SD card status is ejected when the message content obtained by the application layer by parsing the interrupt message comprises an SD card ejected field.

5. The identification method according to claim 1, wherein the unloading operation comprises: stopping read and write operations on an SD card; determining whether the SD card is successfully unloaded; and if not, re-unloading the SD card after waiting for a preset time period.

6. An SD card identification module, comprising:
    a memory storing computer executable instructions; and
    a processor configured to execute the instructions to:
    trigger an interrupt message according to an SD card inserting or ejecting behavior;
    determine an SD card status according to the interrupt message during operation of a device; and
    perform a corresponding SD card operation according to the SD card status determined;
    wherein the processor is further configured to:
    perform a loading operation when the SD card status is inserted; and
    perform an unloading operation when the SD card status is ejected;
    wherein the processor is further configured to:
    determine whether a test file is writeable into the loaded SD card and deletable from the SD card; if so, determine that the SD card is successfully loaded; and if not, determine that the SD card is unsuccessfully loaded.

7. The SD card identification module according to claim 6, wherein the processor is further configured to: determine the SD card status by searching for a device node during booting of the device.

8. The SD card identification module according to claim 7, wherein the processor is further configured to:
determine whether the device node is allowed to be started; if not, determine that the SD card status is ejected;
if so, search the device node for an SD card node and a corresponding SD card partition;
determine that the SD card status is inserted when the SD card node and the SD card partition are searched out; and
determine that the SD card status is ejected when the SD card node and the SD card partition are not present.

9. The SD card identification module according to claim 6, wherein the processor is further configured to: trigger a corresponding kernel interrupt in response to the SD card inserting or ejecting behavior, and transmit a corresponding interrupt message to an application layer according to the kernel interrupt; the message parsing unit is in the application layer and is specifically configured to parse the interrupt message to obtain message content, determine that the SD card status is inserted when the message content comprises an SD card inserted field, and determine that the SD card status is ejected when the message content comprises an SD card ejected field.

10. The SD card identification module according to claim 6, wherein the processor is further configured to: stop read and write operations on an SD card; determine whether the SD card is successfully unloaded; and if not, re-unload the SD card after waiting for a preset time period.

11. An electronic device, comprising an SD card slot and a controller, wherein the SD card slot is configured to receive an SD card and establish an electrical connection to the SD card;
the controller is connected to the SD card slot to perform data read and write operations on the SD card inserted into the SD card slot; and
the controller further comprises the SD card identification module to identify, through the SD card identification module, an SD card inserting or ejecting behavior that occurs in the SD card slot;
the SD card identification module, comprising:
a memory storing computer executable instructions; and
a processor configured to execute the instructions to:
trigger an interrupt message according to an SD card inserting or ejecting behavior;
determine an SD card status according to the interrupt message during operation of a device; and
perform a corresponding SD card operation according to the SD card status determined;
wherein the processor is further configured to:
perform a loading operation when the SD card status is inserted; and
perform an unloading operation when the SD card status is ejected;
wherein the processor is further configured to:
determine whether a test file is writeable into the loaded SD card and deletable from the SD card; if so, determine that the SD card is successfully loaded; and if not, determine that the SD card is unsuccessfully loaded.

* * * * *